US012567347B2

(12) United States Patent
Rogan

(10) Patent No.: US 12,567,347 B2
(45) Date of Patent: Mar. 3, 2026

(54) AIRPORT ADVERTISING SYSTEM

(71) Applicant: Denann Consultant Services Pty Ltd,
Goulburn (AU)

(72) Inventor: Denis Rogan, Goulburn (AU)

(73) Assignee: Denann Consultant Services Pty Ltd,
Goulburn (AU)

( * ) Notice: Subject to any disclaimer, the term of this
patent is extended or adjusted under 35
U.S.C. 154(b) by 602 days.

(21) Appl. No.: 17/786,116

(22) PCT Filed: Dec. 16, 2020

(86) PCT No.: PCT/AU2020/051375
§ 371 (c)(1),
(2) Date: Jun. 16, 2022

(87) PCT Pub. No.: WO2021/119735
PCT Pub. Date: Jun. 24, 2021

(65) Prior Publication Data
US 2023/0018691 A1      Jan. 19, 2023

(30) Foreign Application Priority Data
Dec. 20, 2019      (NZ) ........................................ 760497

(51) Int. Cl.
*G09F 19/22*          (2006.01)
*G06Q 30/0241*        (2023.01)
(Continued)

(52) U.S. Cl.
CPC ....... *G09F 19/228* (2013.01); *G06Q 30/0241*
(2013.01); *G09F 2027/001* (2013.01)

(58) Field of Classification Search
CPC ...................................................... G06Q 30/02
(Continued)

(56) References Cited

U.S. PATENT DOCUMENTS

| 5,182,563 A | 1/1993 | Blinchikoff et al. |
| 6,354,714 B1 | 3/2002 | Rhodes |

(Continued)

FOREIGN PATENT DOCUMENTS

| CA | 2069232 A1 | 11/1992 |
| WO | WO 02/15161 A1 | 2/2002 |

OTHER PUBLICATIONS

Supplementary European Search Report issued on Dec. 8, 2023 for
corresponding European Application No. 20903328.

*Primary Examiner* — Afaf Osman Bilal Ahmed
(74) *Attorney, Agent, or Firm* — POLSINELLI PC

(57)          ABSTRACT

An airport airside advertising system 1 displays advertising
to passengers of adjacent commercial aircraft. An advertis-
ing billboard 7 or 7A is disposed on the airside of an airport
adjacent to a runway, taxiway or apron 2, 3, 4 and 12. The
advertising billboard 7 or 7A is configured to face a direction
substantially perpendicular to the direction of movement of
an adjacent aircraft 11 during landing, take off, taxiing or
temporary parking thereof, the billboard 7 or 7A dimen-
sioned to display advertising visible to passengers in adja-
cent commercial aircraft 11. The advertising billboard 7 or
7A has one or more sensor elements 8 associated therewith
and configured to provide an actuation signal in response to
detection by one or more sensor elements 8 of an adjacent
aircraft 11 within a predetermined range.

20 Claims, 4 Drawing Sheets

(51) Int. Cl.
    *G06Q 30/02*        (2023.01)
    *G09F 27/00*        (2006.01)

(58) Field of Classification Search
    USPC .............................................. 705/14.02, 14.1
    See application file for complete search history.

(56)                      References Cited

U.S. PATENT DOCUMENTS

| | | |
|---|---|---|
| 8,990,108 B1 | 3/2015 | Mann et al. |
| 2005/0286972 A1 | 12/2005 | Gongolas |
| 2008/0106456 A1 | 5/2008 | Ootomo et al. |
| 2008/0154728 A1* | 6/2008 | Thomas .................. G09F 19/22 |
| | | 705/14.4 |
| 2010/0145799 A1 | 6/2010 | Caesar |
| 2016/0140885 A1 | 5/2016 | Palmer et al. |
| 2016/0292744 A1* | 10/2016 | Strimaitis .......... G06Q 30/0269 |

\* cited by examiner

AIRPORT ADVERTISING SYSTEM

CROSS REFERENCE TO RELATED APPLICATIONS

This application is a National Phase filing under 35 U.S.C. § 371 of PCT/AU2020/051375 filed on 16 Dec. 2020; which application in turn claims priority to Application No. 760497 filed in New Zealand on 20 Dec. 2019. The entire contents of each application are hereby incorporated by reference.

FIELD OF THE INVENTION

The present invention relates to airports and, in particular, to a system of displaying advertising to aircraft passengers when on the airside of an airport.

The invention has been developed primarily for use at airports servicing commercial passenger aircraft and will be described hereinafter with reference to this application. However, it will be appreciated that the invention is not limited to this particular field of use.

BACKGROUND ART

It is well-known that airports are typically divided into two sections, the airside and the landside. The landside of the airport is the area in which passengers and members of the public are able to traverse. This includes car parks, terminal buildings, public transport amongst many others. The airside of the airport is very much a restricted area to passengers and the general public and relatively few people have access to these areas mostly for security reasons. These areas include runways, taxiways, aprons and areas surrounding aircraft movement paths and it will be appreciated that passengers are only able to access the airside of an airport when in an aircraft or heading to board an aircraft or disembark from one.

Commercial advertising to passengers and other users of the airport mostly occurs on the landside of the airport when passengers are in a terminal or entering or exiting the airport. Significant numbers of advertisements are displayed to passengers and airport users often in billboard form ranging in size from that approximating a poster to many square metres. In the case of an Australian airport such as the Sydney airport for example, users are presented with advertising at very many opportunities whether entering or exiting the airport by vehicle or train and this advertising is presented at every landside part of the airport where passengers traverse, including even bathrooms.

The most advanced teachings of providing advertising on the airside of an airport are found in international PCT patent publication number WO2/15161 (PCT/AU/01/01015). This teaches a system for the display of advertising on the airside of an airport. More particularly, the PCT publication provides a horizontal billboard being approximately level with a ground surface and which is disposed on the airside of an airport and which is visible to passengers in aircraft on a runway, taxiways or apron. One of the examples described in that publication was disposed at Sydney International Airport, early in the millennium. Here, an advertisement for the AMEX company was painted onto grass adjacent one taxiway for observation by passengers. Advantageously, it was acknowledged that passengers in an aircraft in the runway adjacent the advertisement also had a clear view thereof.

Whilst the disclosure of the PCT publication provided significant new benefit over what was previously known, that disclosure is limited to providing a billboard that is merely disposed on a ground surface adjacent a runway or taxiway.

Genesis of the Invention

The genesis of the present invention is a desire to provide an airport advertising system which overcomes one or more disadvantages of the prior art, or to provide a useful alternative.

SUMMARY OF THE INVENTION in accordance with a first aspect of the present invention there is disclosed an airport airside advertising system for displaying advertising to passengers of adjacent commercial aircraft, the system comprising:

an advertising billboard disposed on the airside of an airport adjacent to a runway, taxiway or apron wherein the airside of the airport includes at least one runway and at least one taxiway;

the advertising billboard being configured to face a direction substantially perpendicular to the direction of movement of an adjacent aircraft during landing, take off, taxiing or temporary parking thereof, the billboard being dimensioned to display advertising visible to passengers on adjacent commercial aircraft; and one or more sensor elements associated with the advertising billboard and configured to provide an actuation signal in response to detection by one or more sensor elements of an adjacent aircraft within a predetemined range.

Preferably, the system includes an advertising controller configured to illuminate the advertising billboard upon receipt of a sensor actuation signal when an adjacent aircraft is within a predetermined range such that no advertising is displayed unless an aircraft is adjacent and within a predetermined range.

In preferred embodiments, the one or more sensor elements include microwave or radio frequency sensors, optical beams, passive infrared sensors and image recognition camera sensors, the sensors being integrally formed or adjacent with the billboard or remote therefrom.

Preferably, the one or more sensor elements include an aircraft transponder detector configured to interrogate adjacent commercial aircraft transponders such that receipt of a signal by the advertising system subsequent to an interrogation causes the actuation signal to actuate the advertising in response for a predetermined period of time. More preferably, in response to the aircraft transponder detector receiving a signal subsequent to sending an interrogation signal, said system determines an origin of the adjacent aircraft and selectively displays predetermined advertising on the advertising billboard corresponding to an origin of the passenger aircraft identified after interrogation by the aircraft transponder detector.

In preferred embodiments, the advertising billboard is substantially horizontal, substantially vertical or inclined at a predetermined angle. Preferably, the advertising billboard is disposed on or closely adjacent ground surface or is disposed on a substantially vertical surface, most preferably an existing structure. Preferably, the advertising billboard is painted on a ground surface or a structure adjacent ground surface and includes an illumination source configured to illuminate an advertisement in response to a signal from the one or more sensor elements; or the advertising billboard is defined by an image projected from an advertising image source for a predetermined period of time in response to a signal from the one or more sensors.

Preferably, the advertising billboard includes a framed display mounted to a vertical surface of the structure on the airside of an airport, the framed display being illuminated for a predetermined period in response to a signal from the one or more sensors. In some preferred embodiments, the advertising billboard comprises one or more LED display panels, digital display panels, printed polymer membrane sheets or comprises a screen on which advertising can be projected and displayed.

In preferred embodiments, the advertising billboard is configured to be mounted to an existing vertically extending structure on the airside of the airport.

It can therefore be seen that there is advantageously provided an airport airside advertising system which advantageously senses when a passenger aircraft is adjacent and is configured to display advertising for a predetermined period of time while the passenger aircraft is adjacent. Furthermore, continuous or different advertisements can be advantageously displayed and particularly save on electricity by displaying advertisements only when a passenger aircraft is adjacent. It will be appreciated that the advertisements can be displayed when a passenger aircraft is adjacent the display so that the advertising billboard is not illuminated to be in the field of view of a pilot when approaching the billboard.

Yet further, by using a means of identifying an adjacent commercial passenger aircraft such as by an aircraft flight transponder advertising can be targeted based on known or presumed characteristics of passengers on the adjacent aircraft for display as they pass the billboard. It will also be appreciated that the advertising system disclosed in international PCT patent publication number WO02/15161 is improved upon by the invention herein particularly as regards the efficient use of sensing apparatus and also in cases where luminescent paint is employed on a billboard surface on the airside of an airport to save power consumption and capital costs.

BRIEF DESCRIPTION OF THE DRAWINGS

A preferred embodiment of the invention will now be described, by way of example only, with reference to the accompanying drawings in which.

DETAILED DESCRIPTION

Figure 1:
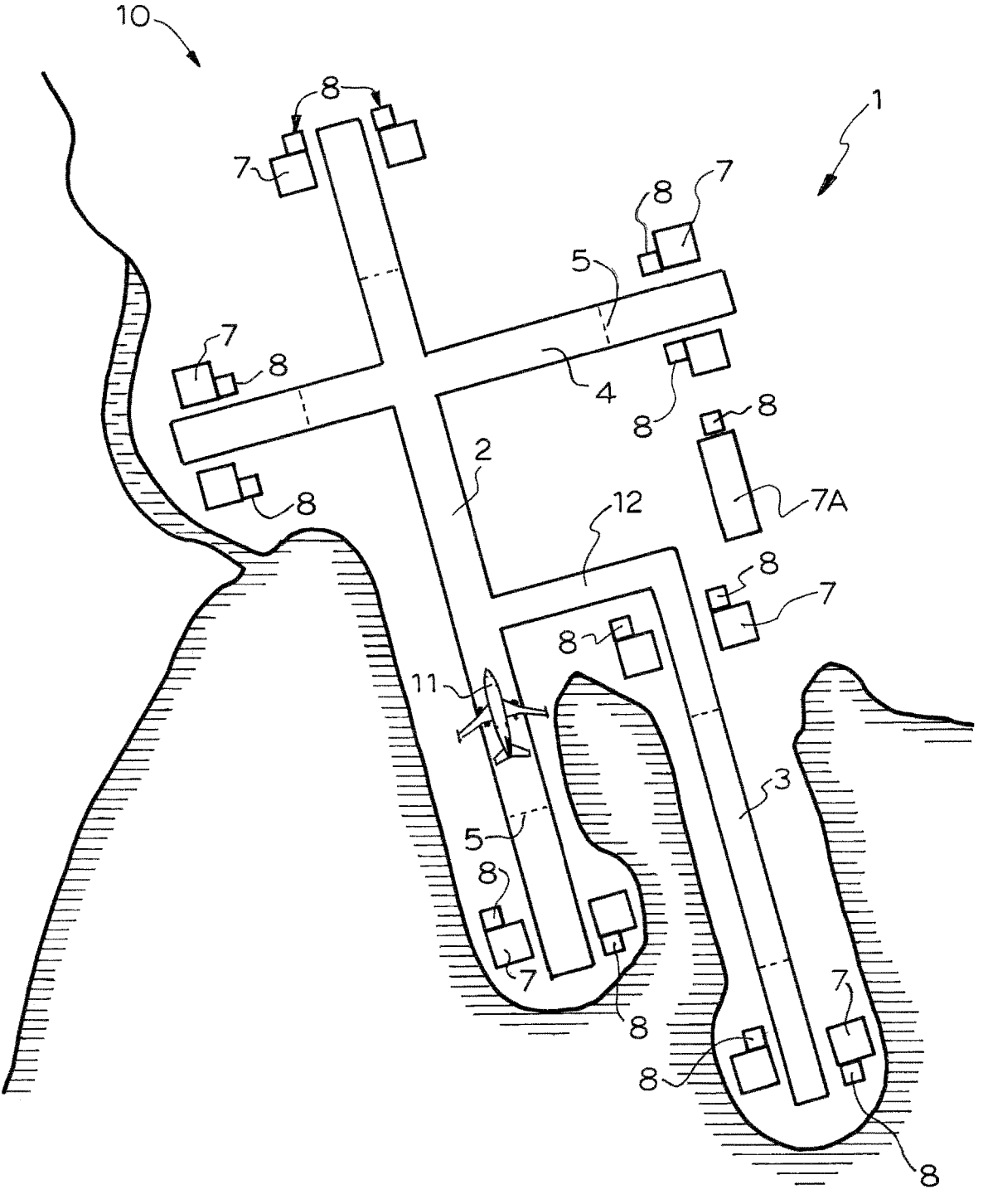
FIG. 1 is a schematic plan view of part of an exemplary commercial airport having an advertising system on the airside thereof according to a preferred embodiment of the invention.

In the drawings generally, like reference numerals are used to denote like components unless expressly denoted otherwise. Referring generally to the Figs, there is shown an airport advertising system 1 disposed on the airside of the airport 10. The system 1 is configured to display advertising to passengers of adjacent commercial aircraft 11 when on the airside of the airport 10. It will be appreciated that only a single commercial aircraft 11 is shown in the accompanying drawings for simplicity and that advertising can be directed to a plurality of commercial aircraft 11 on the airside of the airport 10.

Figure 2:
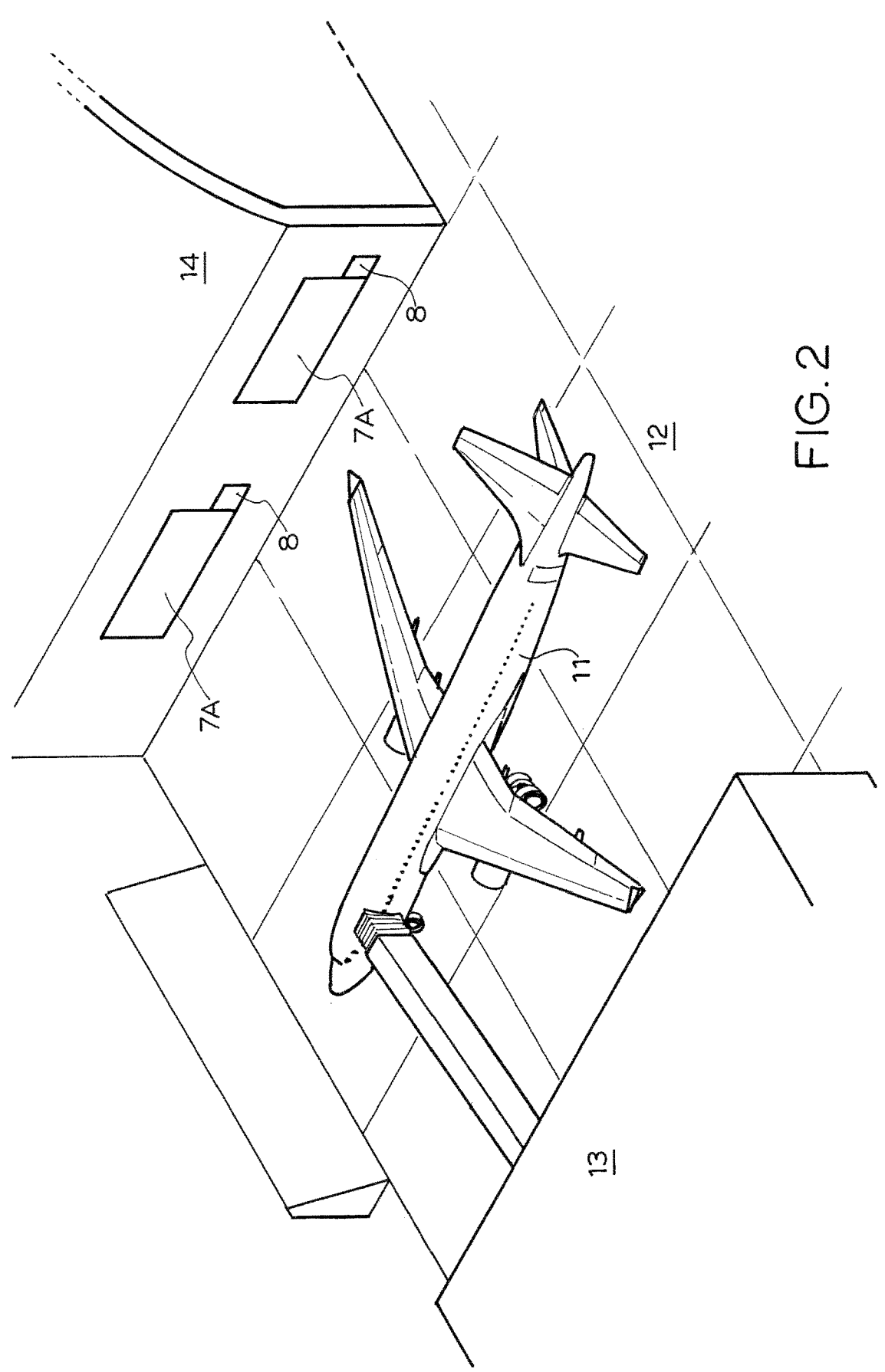
FIG. 2 is a schematic elevated perspective view of another part of the commercial airport of FIG. 1 having the advertising system on the airside thereof according to the preferred embodiment.

The system 1 includes a plurality of advertising billboards 7 or 7A disposed on the airside of an airport adjacent to a runway, taxiway or apron. FIG. 1 shows a runway 2, 3, 4 arrangement at the airport 10, and FIG. 2 shows airport 10 taxiways 12 together with airport terminals 13 and other buildings 14 disposed on the airside of the airport 10. It will be appreciated that the terminals 13 and buildings 14 can have a perimeter or part of a perimeter on an airport air side boundary.

Each advertising billboard 7 or 7A is configured to face a direction substantially perpendicular to the direction of movement of adjacent aircraft 11 during landing, take off, taxiing or temporary parking thereof. In the case of FIG. 1, the billboards 7 or 7A is preferably substantially horizontal or is disposed a distance away from the central line of runways 2, 3, 4 or extends upward a predetermined height. Touchdown zones 5 of the runways 2, 3 & 4 are also shown. In each case, the billboard 7 or 7A is dimensioned to display advertising visible to passengers on adjacent commercial aircraft 11. Conventional billboards such as those disclosed in PCT patent publication number WO02:15161 can be employed in the preferred embodiments of the present invention.

Reference is made to the ICAO regulations (Obstacle Limitation Surfaces) concerning the operation of commercial airports with respect to any billboard 7 or 7A extending upwardly from the ground on the airside of the airport. It will be appreciated that any non-substantially horizontal billboards 7A according to the preferred embodiment must be some minimum distance from a centre line of runway 2, 3, 4 depending on whether the runway is rated for instrument or visual pilot use. In accordance with such regulations, when the billboard 7A extends within an envelope commencing approximately 75 m from the centre line of a runway 2, 3, 4 for visual flight reference or 150 m from the centre line for instrument flight reference it can extend upward vertically from that distance to a height within a gradient envelope of 1:7. Reference is made generally to the ICAO regulations, for example, as implemented by the Civil Aviation Safety Authority in Australia (CASA). See CASA Manual of Standards MOS139, available at https://www.casa.gov.au/rules-and-regulations/changing-rules/casr-regulatory-structure/casr-part-139-aerodromes.

In the drawings, the advertising billboards denoted numeral 7 are substantially horizontal and preferably closely adjacent ground surface such as shown by way of example in the above referenced PCT patent publication. Billboard 7A, shown adjacent the end of runway 3, is substantially vertical and dimensioned to be seen by passengers landing, taking off or taxing along runway 3. The vertical height of billboard 7A can be maximised to comply with the above ICAO regulations for commercial aircraft 11. Additional billboards 7A are shown in FIG. 2 and are substantially vertical and disposed adjacent substantially vertical surfaces such as hangar walls and blast walls to which commercial aircraft 11 taxi to and from landing at the airport 10. It will be appreciated, however, whilst the preferred embodiment refers to existing structures on the airside of an airport the billboards 7 can be disposed on a new structure or a vertically retractable or 'pop-up' structure.

Associated with each billboard 7 (or 7A) is a sensor element 8 as shown in FIGS. 1 & 2. The sensor elements 8 are each configured to provide an actuation signal in response to detection thereby of an adjacent aircraft 11 within a predetermined range and to which advertising is desired to be presented to the passengers. Most preferably, the predetermined range will be to allow all passengers to view the billboard 7 or 7A on approach, during passing and for a period of time after passing given the relatively narrow field of view passengers on commercial aircraft 11 experience. As described below, it is most preferable for the advertising billboard not to be illuminated while it is approximately within the field of view of a pilot approaching it.

The advertising system 1 of the preferred embodiment includes an advertising controller (not illustrated) in communication with the one or more sensors 8. Receipt of an actuation signal from a sensor 8 by the advertising controller controls illumination of the advertising billboard when an adjacent aircraft is within a predetermined range such that no advertising is displayed unless an aircraft is adjacent and within a predetermined range. In this way, each billboard 7 or 7A can have one or more sensors 8 associated with it, as well as a plurality of billboards 7 or 7A can be grouped and actuated by a single sensor 8.

In the preferred embodiments of the invention, the sensors 8 are in the form of microwave sensors whereby a microwave signal is generated thereby and a reflected signal is received to indicate an object within the path of the beam. An actuation signal in response to this is then sent to the advertising billboard controller (not illustrated).

Figure 3:
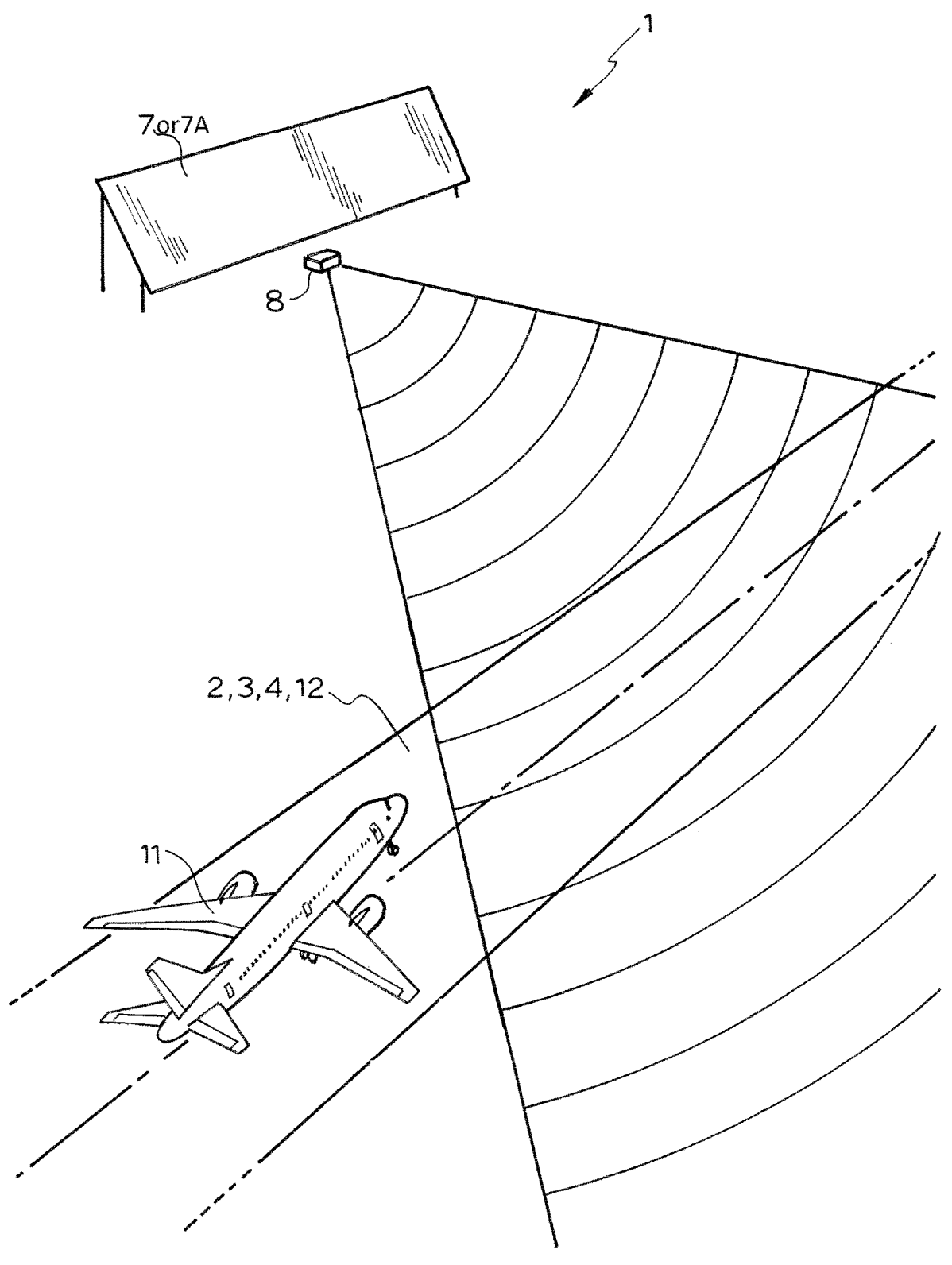
FIG. 3 is a schematic view of an aircraft approaching an airside advertising billboard according to another preferred embodiment.
Figure 4:
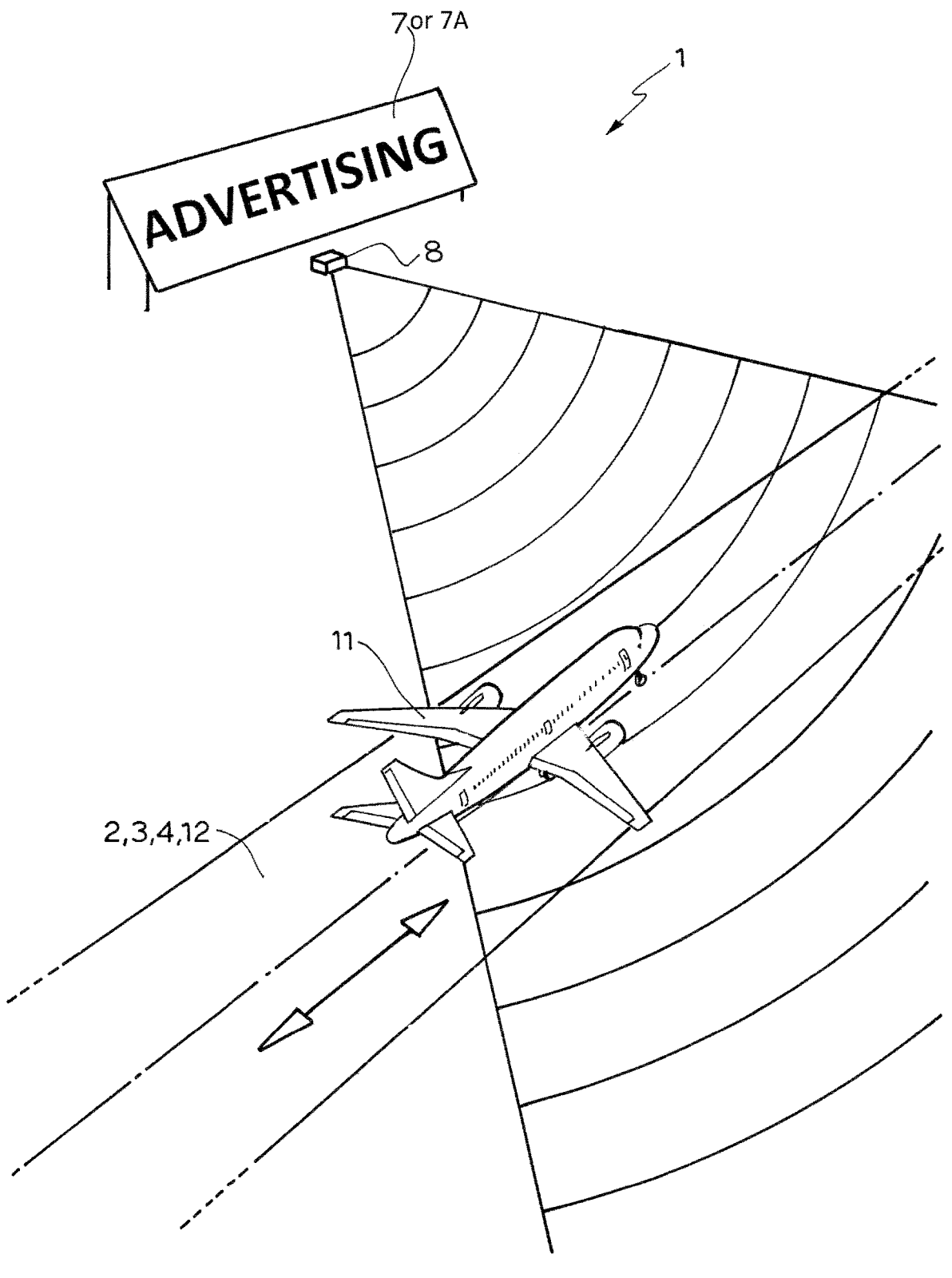
FIG. 4 is a schematic view of an aircraft moved adjacent the airside advertising billboard of FIG. 3.

This arrangement is shown in FIGS. 3 & 4 where aircraft 11 is travelling along a taxiway, runway or apron 2, 3, 4 or 12 at a predetermined speed. The side of the runway or taxiway is billboard 7 or 7A including sensor 8 integrated into a billboard housing. Sensor 8 projects a beam away from billboard 7 or 7A towards the runway or taxiway 2-4 or 12.

In FIG. 3, the aircraft 11 is shown approaching a field of view of the sensor 8 with the billboard 7 or 7A not providing any display. FIG. 4 shows the aircraft 11 having moved along the taxiway or runway 2-4 or 12 to be within the envelope of the beam projected by sensor 8. Once the aircraft 11 is within range of the sensor 8 beam, advertising is displayed on the billboard 7 or 7A. Use of a sensor 8 in this embodiment allows the billboard 7 or 7A to display advertising only when it is able to be seen out the side of the aircraft 11 by the passengers so as to save power but importantly does not distract a pilot as the billboard 7 or 7A does not display advertising until aircraft 11 approaches at some angle, preferably 45° from the billboard 7 or 7A to the taxiway or runway centreline.

It will be appreciated that in other preferred embodiments, not illustrated, the sensors 8 can include radio frequency sensors, optical beams and passive infrared sensors and at that when the system 1 employs a plurality of sensors 8 these can be a combination of different types of sensors 8.

Sensors 8 also include image recognition camera systems whereby an obtained image that matches within certain parameters and expected image of the side of an aircraft when adjacent the sensor 8 and billboard 7 or 7A. That is, the billboard 7 or 7A can be actuated in response to a signal from an image recognition the sensor 8 that the aircraft 11 is approaching, is within a field of view of the passengers observing out windows perpendicular to the direction of travel of the aircraft 11 and for some distance after the aircraft passes whilst the billboard 7 or 7A is still within the field of view of the passengers.

Although not clearly illustrated in the preferred embodiments illustrated in the drawings, the sensors 8 are integrally formed with the billboards 7 or 7A. However, in alternative embodiments, not illustrated, the sensors 8 can be spaced apart from the billboards 7 or 7A with which they are associated and this can be achieved employing wireless communication between sensors 8 and billboards 7 or 7A or by conventional cable connections so that the sensors 8 are disposed remotely from the billboards 7 or 7A. Furthermore, it will be appreciated that an advertising controller (not illustrated) can also be integrally formed with each billboard 7 or 7A or only with at least one billboard 7 or 7A where that billboard communicates with other billboards 7 or 7A to provide an actuation signal.

It will also be appreciated that sensors 8 can include aircraft transponder detector sensor 8 configured to receive signals from the transponders of adjacent commercial aircraft 11 or to send signals to interrogate adjacent commercial aircraft 11 transponders such that receipt of a signal by a sensor 8 subsequent to an interrogation causes the actuation signal to be generated by the advertising controller (not illustrated) so as to actuate advertising on one or more billboards 7 or 7A in response for a predetermined period of time or until the commercial aircraft 11 has passed. In this way, the use of sensors to receive aircraft transponder signals can allow the advertising system 1 to discriminate from passing vehicular traffic or non-commercial aircraft that move adjacent billboards 7 or 7A. Furthermore, a second proximity sensor 8 (not illustrated) can be employed with a billboard 7 or 7A in alternative preferred embodiments whereby receipt by the aircraft transponder detector sensor 8 actuation signal by the advertising controller only causes the billboard display 7 or 7A to illuminate if the second proximity sensor 8 also receives a signal. In this way, distance discrimination or similar is not required when using an aircraft transponder detector sensor 8. This can also be used to ensure an aircraft is substantially adjacent billboards 7 or 7A when it is illuminated.

In preferred embodiments of the invention, sensors 8 can be configured to receive transponder signals from commercial aircraft 11 in response to an interrogation signal or request, not clearly illustrated. The system 1 is configured such that in response to the aircraft transponder detector 8 receiving a signal from the commercial aircraft 11 subsequent to sending an interrogation signal, the advertising system 1 preferably determines an origin or destination of the adjacent commercial aircraft 11 and consequently selectively displays predetermined advertising on the advertising billboard corresponding to an origin or destination of the passenger aircraft 11 identified after interrogation of the aircraft 11 transponder unit.

The advertising billboards 7 & 7A are most preferably mounted to a structure disposed adjacent a ground surface or which is mounted to an existing structure vertical surface such as an external hangar wall or blast wall that is visible from the airside of an airport 10. The billboards 7 & 7A of the preferred embodiment include an illumination source configured to illuminate an advertisement on the advertising billboard for display by the controller (not illustrated) in response to a signal from one or more sensor elements 8. However, it will be appreciated that the advertising billboards 7 & 7A can be projection screens whereby an advertising image/s is projected from an advertising image source such as by a light projector system (not illustrated).

In the case of a light projector system illuminating billboards 7 & 7A these can also be actuated in response to a light sensitive sensor such as a photoelectric cell to automatically illuminate the billboards once an appropriate level of darkness is achieved and the projector system being bright enough to be viewed by passengers on adjacent aircraft 11. It will be appreciated that in all preferred embodiments the advertising system 1 is powered by a solar power source &/or batteries in combination. This is generally advantageous for energy efficiency and lower environmental emissions but particularly so when billboards 7 or 7A are only actuated for a period of time whilst an aircraft 11 passes.

In the preferred embodiments where the advertising billboards 7 & 7A are mounted adjacent ground surface or existing structure, the advertising billboards 7 & 7A preferably include a framed display mounted to the horizontal ground or a vertical surface of the existing structure on the airside of an airport. Yet further, billboards 7 or 7A may also be disposed on vehicular traffic on the airside of an airport in circumstances where such a vehicle is disposed adjacent the commercial aircraft 11 for a significant enough period of time for advertising to be displayed to passengers therein. Such vehicles may include catering trucks, refuelling trucks or general transport vehicles such as vans or buses. In these cases, a billboard 7 or 7A is mounted to the side of the vehicle or upwardly extending from its roof or the like whereby an associated sensor/s 8 detects a presence of a commercial aircraft 11 when it is adjacent in a manner as described above.

In the case where the advertising billboards 7 & 7A are not projected onto when actuated, those billboards 7 & 7A may be provided in the form of one or more LED-type display panels or other digital display panels but may also include a printed polymer membrane sheet (or infinite loop thereof). Such a polymer membrane sheet may be composed of a vinyl polymer such as polyvinylchloride or polyethylene. In either case, the billboard displays 7 or 7A are actuated or illuminated in response to a commercial aircraft 11 being adjacent one or more billboards 7 or 7A so as to most advantageously reduce electrical energy consumption and where particular commercial aircraft 11 are distinguished by location of place of arrival or departure (or some other preferred characteristics of the passengers of such an aircraft 11) advertising can be delivered on billboards 7 & 7A to target a particular language or preferred cultural aspects.

Whilst the above described preferred embodiments employ one or more sensor elements 8 it will be appreciated that the billboards can be controlled by receiving a manual signal from a user rather than a signal received in response to actuation of one or more sensors 8. Similarly, the billboards 7 & 7A can be actuated by means of timers that are pre-set with times to which commercial aircraft 11 will be arriving departing and passengers therein will be at some stage adjacent one of the billboards so that the billboards corresponding to a particular flight or particular time are actuated to correspond to that.

In other preferred embodiments of the invention, the airport advertising system 1 includes the billboard 7 or 7A defined by a three-dimensional spatial volume. The billboard 7 or 7A in such an embodiment is a volume onto which holographic or other laser imaged advertising is projected. The billboard 7 or 7A is operationally substantially identical to the above described embodiments except that a projector element is actuated in response to a signal generated by an associated sensor/s 8 of an adjacent or approaching commercial aircraft 11 and the projector element displays holographic image in a predetermined volume of space adjacent the commercial aircraft 11 on the airside of the airport.

In the preferred embodiments, it will be appreciated that it may be advantageous for advertising billboards 7 or 7A to be able to be controlled by operators of the airport so that they can be illuminated as desired to display safety or security information to the passengers. They may also be used in emergency circumstances to provide information to passengers on adjacent aircraft.

Lastly, referring to the particular disclosure of above referenced international PCT patent publication number WO 02/15161, the substantially horizontal billboards shown therein that are powered or otherwise illuminated can advantageously be replaced generally by the use of a luminescent paint. These paints which include photo luminescent pigments which essentially glow-in-the-dark from a predetermined period of time in response to being subject to incident light, such as daylight. In this way, significant energy costs can be saved whilst still effectively displaying advertising to passengers when ambient lighting conditions are relatively low.

The foregoing describes only one embodiment of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. An airport airside advertising system for non-continuous display of advertising to passengers of commercial aircraft, the system comprising:
 an advertising billboard positioned on the airside of an airport having an airside and a landside and adjacent to a runway, taxiway or apron of the airport wherein the airside of the airport includes at least one runway and at least one taxiway and the landside of the airport includes a terminal building;
 the advertising billboard being mounted to face a direction substantially perpendicular to the direction of movement of an adjacent aircraft during landing, take off, taxiing or temporary parking thereof, the billboard being dimensioned to display advertising visible to passengers on an adjacent aircraft; the billboard being normally off and being turned on by receipt of an actuation signal; and
 one or more sensor elements positioned in proximity to the advertising billboard and configured to provide the actuation signal to the billboard in response to detection by one or more sensor elements of an adjacent aircraft within a predetermined range;
 whereby the billboard only displays the advertising in a direction substantially perpendicular to the direction of movement of a detected aircraft, and only displays the advertising to passengers when in an aircraft, disembarking passengers prior to their arrival at the terminal building and/or departing passengers following their departure from the terminal building.

2. An advertising system according to claim 1 wherein said system includes an advertising controller configured to illuminate the advertising billboard upon receipt of a sensor actuation signal when an adjacent aircraft is within a predetermined range such that no advertising is displayed unless an aircraft is adjacent and within a predetermined range.

3. An advertising system according to claim 1 wherein the one or more sensor elements include microwave or radio frequency sensors, optical beams, passive infrared sensors and image recognition camera sensors, the sensors being integrally formed with or adjacent with the billboard.

4. An advertising system according to claim 1 wherein said one or more sensor elements include an aircraft transponder detector configured to interrogate adjacent commercial aircraft transponders such that receipt of a signal by the advertising system subsequent to an interrogation causes the actuation signal to actuate the advertising in response for a predetermined period of time.

5. An advertising system according to claim 4 wherein in response to the aircraft transponder detector receiving a signal subsequent to sending an interrogation signal, said system determines an origin of the adjacent aircraft and selectively displays predetermined advertising on the advertising billboard corresponding to an origin of the passenger aircraft identified after interrogation by the aircraft transponder detector.

6. An advertising system according to claim 1 wherein the advertising billboard is substantially horizontal, substantially vertical or inclined at a predetermined angle.

7. An advertising system according to claim 6 wherein the advertising billboard is disposed on or closely adjacent ground surface or is disposed on a substantially vertical surface, preferably an existing structure.

8. An advertising system according to claim 7 where the advertising billboard is painted on a ground surface or a structure adjacent ground surface and includes an illumination source configured to illuminate an advertisement in response to a signal from the one or more sensor elements; or the advertising billboard is defined by an image projected from an advertising image source for a predetermined period of time in response to a signal from the one or more sensors.

9. An advertising system according to claim 7 wherein the advertising billboard includes a framed display mounted to a vertical surface of the structure on the airside of an airport, the framed display being illuminated for a predetermined period in response to a signal from the one or more sensors.

10. An advertising system according to claim 1 wherein the advertising billboard comprises one or more LED display panels, digital display panels, printed polymer membrane sheets or comprises a screen on which advertising can be projected and displayed.

11. An advertising system according to claim 1 wherein the advertising billboard is configured to be mounted to an existing vertically extending structure on the airside of the airport.

12. An advertising system according to claim 2 wherein the one or more sensor elements include microwave or radio frequency sensors, optical beams, passive infrared sensors and image recognition camera sensors, the sensors being integrally formed or adjacent with the billboard or remote therefrom.

13. An advertising system according to claim 2 wherein said one or more sensor elements include an aircraft transponder detector configured to interrogate adjacent commercial aircraft transponders such that receipt of a signal by the advertising system subsequent to an interrogation causes the actuation signal to actuate the advertising in response for a predetermined period of time.

14. An advertising system according to claim 3 wherein said one or more sensor elements include an aircraft transponder detector configured to interrogate adjacent commercial aircraft transponders such that receipt of a signal by the advertising system subsequent to an interrogation causes the actuation signal to actuate the advertising in response for a predetermined period of time.

15. An advertising system according to claim 2 wherein the advertising billboard is substantially horizontal, substantially vertical or inclined at a predetermined angle.

16. An advertising system according to claim 3 wherein the advertising billboard is substantially horizontal, substantially vertical or inclined at a predetermined angle.

17. An advertising system according to claim 4 wherein the advertising billboard is substantially horizontal, substantially vertical or inclined at a predetermined angle.

18. An advertising system according to claim 5 wherein the advertising billboard is substantially horizontal, substantially vertical or inclined at a predetermined angle.

19. An advertising system according to claim 2 wherein the advertising billboard comprises one or more LED display panels, digital display panels, printed polymer membrane sheets or comprises a screen on which advertising can be projected and displayed.

20. An advertising system according to claim 3 wherein the advertising billboard comprises one or more LED display panels, digital display panels, printed polymer membrane sheets or comprises a screen on which advertising can be projected and displayed.

* * * * *